(12) United States Patent
Shim et al.

(10) Patent No.: US 11,189,251 B2
(45) Date of Patent: Nov. 30, 2021

(54) ELECTRONIC APPARATUS

(71) Applicant: LG ELECTRONICS INC., Seoul (KR)

(72) Inventors: Hongjo Shim, Seoul (KR); Hyunwoo Kim, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 0 days.

(21) Appl. No.: 16/880,888

(22) Filed: May 21, 2020

(65) Prior Publication Data
US 2021/0295803 A1 Sep. 23, 2021

(51) Int. Cl.
G09G 5/38 (2006.01)
G06F 3/041 (2006.01)
G06F 3/043 (2006.01)
G01L 1/22 (2006.01)
G01L 1/16 (2006.01)

(52) U.S. Cl.
CPC .............. G09G 5/38 (2013.01); G01L 1/16 (2013.01); G01L 1/22 (2013.01); G06F 3/043 (2013.01); G06F 3/04144 (2019.05); G09G 2340/0471 (2013.01); G09G 2340/0478 (2013.01); G09G 2340/0492 (2013.01); G09G 2354/00 (2013.01); G09G 2380/02 (2013.01)

(58) Field of Classification Search
CPC ............ G09G 5/38; G09G 2340/0492; G09G 2340/0478; G09G 2340/0471; G09G 2354/00; G09G 2380/02; G06F 3/043; G06F 3/04144; G01L 1/22; G01L 1/16
See application file for complete search history.

(56) References Cited

U.S. PATENT DOCUMENTS

| 10,878,728 | B2 | 12/2020 | Yoon | |
|---|---|---|---|---|
| 2012/0162876 | A1* | 6/2012 | Kim | H04M 1/0237 361/679.01 |
| 2013/0076649 | A1* | 3/2013 | Myers | G06F 3/0485 345/173 |

(Continued)

FOREIGN PATENT DOCUMENTS

| JP | 10254595 | 9/1998 |
|---|---|---|
| JP | 2011180943 | 9/2011 |

(Continued)

OTHER PUBLICATIONS

European Patent Office Application Serial No. 20180017.4, Search Report dated Sep. 18, 2020, 12 pages.

(Continued)

*Primary Examiner* — Brent D Castiaux
(74) *Attorney, Agent, or Firm* — Lee, Hong, Degerman, Kang & Waimey

(57) ABSTRACT

Provided is an electronic apparatus including a display configured to output an image through a front surface of the electronic apparatus, an input part arranged to face a side surface of the electronic apparatus and comprising a first region and a second region, and a controller. The controller is configured to determine either the first region or the second region as an activation region based on a posture of the electronic apparatus, and receive a user input through the activation region. Various other embodiments are possible.

20 Claims, 20 Drawing Sheets

(56) References Cited

U.S. PATENT DOCUMENTS

| | | | |
|---|---|---|---|
| 2016/0081204 A1* | 3/2016 | Park ................... | H04M 1/0268 |
| | | | 361/807 |
| 2018/0267574 A1* | 9/2018 | Cho ....................... | G06F 3/017 |
| 2021/0026532 A1 | 1/2021 | Park et al. | |

FOREIGN PATENT DOCUMENTS

| KR | 1020130127649 | 11/2013 |
|---|---|---|
| KR | 20140099004 | 8/2014 |
| KR | 1020200007366 | 1/2020 |

OTHER PUBLICATIONS

PCT International Application No. PCT/KR2020/003615, International Search Report dated Dec. 17, 2020, 4 pages.

\* cited by examiner

ELECTRONIC APPARATUS

CROSS-REFERENCE TO RELATED APPLICATIONS

Pursuant to 35 U.S.C. § 119 (a), this application claims the benefit of an earlier filing date and right of priority to International Application No. PCT/KR2020/003615 filed on Mar. 17, 2020, the contents of which are hereby incorporated by reference herein in its entirety.

BACKGROUND

1. Field

The present disclosure relates to an electronic apparatus.

2. Description of the Related Art

With the development of digital technologies, various types of electronic apparatus such as mobile communication terminals, smart phones, and tablet personal computers (PCs) have been widely used.

In general, a display provided in an electronic apparatus may have a rectangular (or bar) shape in which a lengths and a width are different. In addition, it is common that the appearance of the electronic apparatus equipped with such a display also has a rectangular shape to correspond to the shape of the display.

In the meanwhile, as the performance of electronic apparatus has improved, the demands for a large-area display capable of more efficiently providing various functions are increasing. In order to meet such demands, an electronic apparatus with a flexible display (e.g., a foldable display, a rollable display, and the like) having sufficient elasticity, at least a part of which can be folded or rolled and when necessary unfolded or unrolled, has been studied.

SUMMARY

An electronic apparatus needs to provide suitable usability in consideration of user convenience. For example, a rectangular electronic apparatus may be required to output an image matching an expected field of view of a user by selectively rotating an image output orientation of a display according to a change in posture of the electronic apparatus, such as whether the user grips the electronic apparatus in a portrait direction or a landscape direction.

However, even if the posture of the electronic apparatus is changed, an input part disposed on one side of a frame of the electronic apparatus is fixed at a certain position. Thus, although it is easy to input a signal through the input part when the user grips the electronic apparatus in the portrait direction, it may be difficult to touch or press the input part when the user grips the electronic apparatus in the landscape direction.

In an aspect, there is provided an electronic apparatus including a display configured to output an image through a front surface of the electronic apparatus, an input part arranged to face a side surface of the electronic apparatus and comprising a first region and a second region, and a controller. The controller is configured to determine either the first region or the second region as an activation region based on a posture of the electronic apparatus, and receive a user input through the activation region.

For example, the electronic apparatus may further include at least one sensor, and the controller may be configured to acquire information associated with the posture of the electronic apparatus using the at least one sensor and determine a mode of the electronic apparatus as being a landscape mode or a portrait mode based on the acquired information.

For example, the controller may be configured to determine an image output orientation of the display and the activation region of the input part based on the determined mode.

For example, the controller may be configured to, based on the determined mode of the electronic apparatus being the landscape mode, determine the first region as the activation region, and, based on the determined mode of the electronic apparatus being the portrait mode, determine the second region as the activation region.

For example, the controller may be configured to, based on determining the first region as being the activation region, deactivate the second region, and, based on determining the second region as being the activation region, deactivate the first region.

For example, the controller may be configured to execute a designated function based on the user input being received through the determined activation region.

For example, the first region and the second region may be spaced apart from each other on a same plane.

For example, the input part may include a strain gauge, and the strain gauge may include the first region, the second region, and a deactivation region interposed between the first region and the second region.

In another aspect, there is provided an electronic apparatus including a frame comprising a first frame and a second frame disposed to be slidable with respect to the first frame, a flexible display supported by the frame and having a first image output region for outputting an image through a front surface of the electronic apparatus, the first image output region changing in size in correspondence with relative movement between the first frame and the second frame, an input part comprising a first region and a second region, at least one sensor; and a controller. The controller may be configured to acquire information associated with at least one of a posture of the electronic apparatus or the size of the first image output region using the at least one sensor, and determine either the first region or the second region as an activation region of the input part based on the acquired information; and receive a user input through the activation region.

For example, the controller is configured to determine a mode of the electronic apparatus as being either a landscape mode or a portrait mode based on information associated with the posture of the electronic apparatus, and determine an image output orientation of the first image output region and the activation region of the input part based on the determined mode.

For example, the controller may be configured to, based on the determined mode of the electronic apparatus being the portrait mode, determine the first region as the activation region, and based on the determined mode of the electronic apparatus being the landscape mode and the size of the first image output region being equal to or greater than a predetermined size, determine the second region as the activation region.

For example, the controller may be configured to, based on determined mode of the electronic apparatus being the landscape mode and the size of the first image output region being less than the predetermined size, determine the first region as the activation region.

For example, the first image output region, when expanded, may be substantially rectangular.

For example, the first region and the second region may be arranged to face a first side surface of the first frame, and the second region may be positioned closer than the first region to a second side surface of the second frame that is perpendicular to the first side surface of the first frame.

For example, the controller may be configured to in response to determining, based on the posture of the electronic apparatus, that the first side surface is positioned at an upper part of the electronic apparatus, determine the mode of the electronic apparatus as being the landscape mode, and, in response to determining, based on the posture of the electronic apparatus, that the first side surface is positioned at a lower part of the electronic apparatus, determine the mode of the electronic apparatus as being the portrait mode.

For example, the input part may include at least one of a pressure sensor (e.g., a strain gauge) or an ultrasonic sensor (e.g., a piezo sensor).

For example, the input part may include a strain gauge, and the strain gauge may include the first region, the second region, and a deactivation region interposed between the first region and the second region.

For example, the input part may include a plurality of sensor sets arranged to correspond to the first region and the second region, and the plurality of sensor sets may include a strain gauge and a plurality of piezo sensors arranged with the strain gauge interposed therebetween.

For example, the first region and the second region may be spaced apart from each other on a same plane.

For example, the input part may include a first region, a second region, a third region, and a fourth region sequentially arranged on a same plane and spaced apart from each other at predetermined intervals, and the controller may be configured to, based on the acquired information, determine the first and third regions or the second and fourth regions as activation regions.

For example, the input part may include at least one of a pressure sensor or an ultrasonic sensor, and at least one of the pressure sensor or the ultrasonic sensor may be mounted to a printed circuit board electrically connected to the controller.

For example, the at least one sensor may include at least one of a gyro sensor or an optical sensor.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
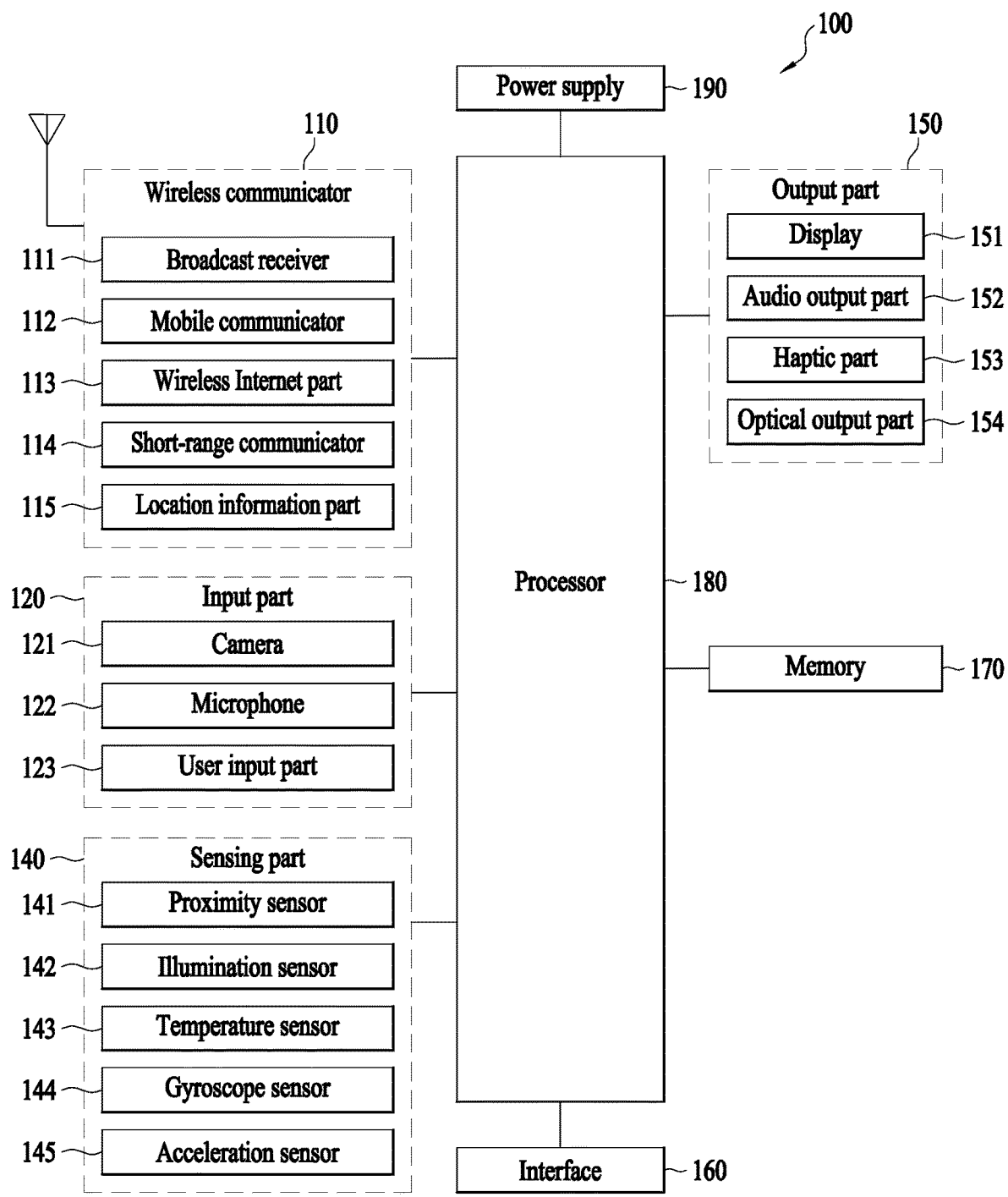
FIG. 1 is a block diagram of an electronic apparatus according to various embodiments of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram illustrating an electronic apparatus according to example embodiments of the present disclosure.

Referring to FIG. 1, an electronic apparatus 100 may include at least one of a wireless communicator 110, an input part 120, a sensing part 140, an output part 150, an interface 160, a memory 170, a controller 180, and a power supply 190.

The electronic apparatus 100 may include other components in addition to the components of FIG. 1 and may also include some of the components of FIG. 1.

The wireless communicator 110 may include at least one module that enables wireless communication to be performed between the electronic apparatus 100 and a wireless communication system, between the electronic apparatus 100 and another electronic apparatus (not shown) (e.g., the electronic apparatus 100), or between the electronic apparatus 100 and an external server. The wireless communicator 110 may include one or more modules that connect the electronic apparatus 100 to one or more networks. The wireless communicator 110 may include at least one of a broadcast receiving module 111, a mobile communication module 112, a wireless Internet module 113, a short-range communication (e.g., near-field communication (NFC)) module 114, and a position information module 115.

The input part 120 (e.g., the input portion, the input sensor) may include at least one of an image input part (for example, a camera 121) that receives an image signal input, an audio input part (for example, a microphone 122) that receives an audio signal input, or a user input part 123 that receives a user input. For example, the user input part 123 may receive a user touch input through a touch sensor (or touch panel) provided in a display 151 or receive a user input through a mechanical key. Information collected in the input part 120 (for example, voice data and image data) may be analyzed and processed as a control command of a user.

The sensing part 140 may include one or more sensors to sense at least one of information in the electronic apparatus 100, surrounding environment information of the electronic apparatus 100, or user information.

For example, the sensing part 140 may include at least one of a proximity sensor 141, an illumination sensor 142, a temperature sensor 143, a gyroscope sensor 144, and an acceleration sensor 145. In addition, the sensing part 140 may include a touch sensor, a finger scan sensor, a magnetic sensor, a gravity (G)-sensor, a motion sensor, an RGB sensor, an infrared (IR) sensor, an ultrasonic sensor, an optical sensor, a battery gauge, an environment sensor (for example, a barometer, a hygrometer, a thermometer, a radioactivity sensor, a heat sensor, and a gas detection sensor), or a chemical sensor (for example, an electronic nose, a healthcare sensor, and a biometric sensor).

In the present disclosure, the electronic apparatus 100 may use a combination of pieces of information sensed in at least two sensors among the aforementioned sensors.

The output part 150 may output information related to visual, auditory, or tactile. For example, the output part 150 may include at least one of the display 151, an acoustic output module 152, a haptic module 153, or an optical output part 154.

The display 151 may form a layer structure with a touch sensor or be integrally formed with the touch sensor, thereby implementing a touch screen that provides a touch input function and a screen display function simultaneously. For example, the touch screen may function not only as the user input part 123 that provides an input interface between the electronic apparatus 100 and a user but also as the output part 150 that provides an output interface between the electronic apparatus 100 and the user.

The electronic apparatus 100 may include the display 151 to display the image information. The display 151 may be a flexible type display to be rolled, bent, or folded. The flexible display may be manufactured on a thin and flexible substrate so as to be curved, bent, folded, twisted, or rolled like a paper while having a characteristic of a typical flat panel display.

The flexible display may implement a flexible touch screen in combination with a touch sensor. For example, the controller 180 may sense a touch input through the flexible touch screen of the flexible display and perform various functions corresponding to the touch input.

The electronic apparatus 100 may include a deformation detection means (not shown) that detects a change in shape of the flexible display. The electronic apparatus 100 may sense the change in shape of the flexible display using at least one component of the sensing part 140. For example, based on the change in shape of the flexible display sensed by at least one of the deformation detection means (not shown) or the sensing part 140, the controller 180 may change information displayed on the flexible display or generate a control signal.

The change in shape of the flexible display may include, for example, a change in size of a flexible display area viewable through the first surface (e.g., the front surface) of the electronic apparatus 100. For example, in response to a partial area of the flexible display being rolled, folded, or bent, a size of an image display area of the flexible display facing the first surface of the electronic apparatus 100 may be increased or reduced.

The change in shape of the flexible display may be caused based on an external force applied by a user but not limited thereto. The electronic apparatus 100 may automatically change the shape of the flexible display based on, for example, a predetermined application command or an input through the input part 120 or the sensing part 140. The electronic apparatus 100 may further include a driving part for changing the shape of the display. For example, the electronic apparatus 100 may change a position at which the flexible display is rolled or bent in response to the driving part being operated, thereby increasing or reducing the size of the flexible display viewable on the first surface. The driving part may be operated under a control of the controller 180.

The audio output module 152 may externally output audio data stored in the memory 170 or received from the wireless communicator 110 in a call signal reception, a call mode or a recording mode, a voice recognition mode, a broadcast reception mode, or the like. The audio output module 152 may output an acoustic signal associated with a function (for example, a call signal reception sound and a message reception sound) performed in the electronic apparatus 100. For example, the audio output module 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. For example, an event occurring in the electronic apparatus 100 may include at least one of message reception, call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform a control or a function associated with the connected external device.

The memory 170 may store data related to various functions of the electronic apparatus 100. For example, the memory 170 may store application programs (or applications) run in the electronic apparatus 100, data for operation of the electronic apparatus 100, and instructions. As an example, at least a portion of the application programs may be downloaded from an external server through wireless communication. As another example, at least a portion of the application programs may be previously stored in the memory 170 for a function (for example, call forwarding and outgoing function and message receiving and outgoing function) of the electronic apparatus 100. The application program stored in the memory 170 may be run to perform a predetermined operation (or function) of the electronic apparatus 100 based on the controller 180.

The controller 180 (e.g., processor) may control an overall operation of the electronic apparatus 100. For example, the controller 180 may process a signal, data, information, and the like input or output through components of the electronic apparatus 100 or run the application program stored in the memory 170, thereby providing information to a user or performing a predetermined function.

For example, to run the application program stored in the memory 170, the controller 180 may control at least a portion of the components of the electronic apparatus 100 of FIG. 1. To run the application program, the controller 180 may operate a combination of two or more components among the components included in the electronic apparatus 100.

The power supply 190 may supply power to each component included in the electronic apparatus 100 by receiving external or internal power based on a control of the controller 180. The power supply 190 may include a battery. The battery may include a built-in battery or a removable battery.

At least a portion of the aforementioned components of the electronic apparatus 100 may operate in cooperation with each other to implement an operation, a control, or a control method of the electronic apparatus 100 according to various embodiments as described below. Also, the operation, control, or control method of the electronic apparatus 100 may be embodied by running at least one application program stored in the memory 170.

The electronic apparatus 100 and the display 151 may be in a bar shape. However, embodiments are not limited thereto. The electronic apparatus 100 may have various shapes within the scope of not contradicting features of the present disclosure.

Figure 2A:
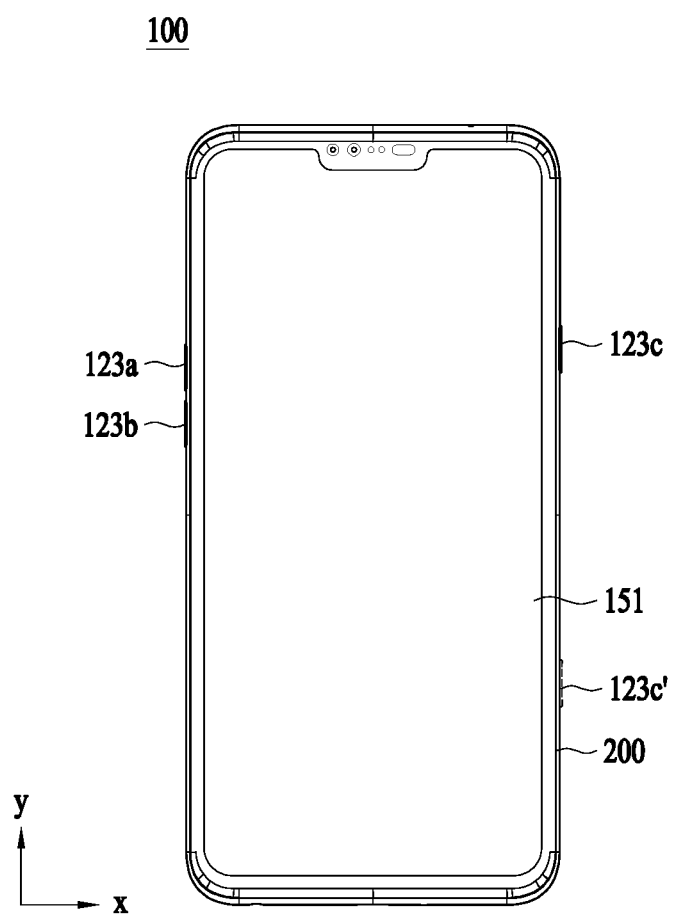
FIG. 2A is a front view of an electronic apparatus according to an embodiment of the present disclosure.
Figure 2B:
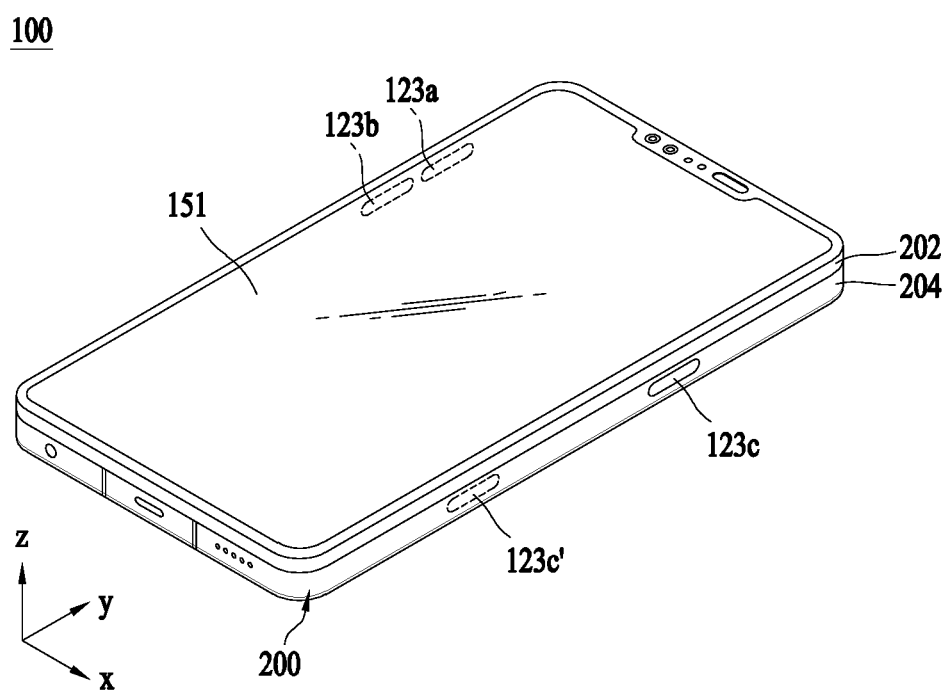
FIG. 2B is a perspective view of an electronic apparatus according to an embodiment of the present disclosure.

FIG. 2A is a front view of an electronic apparatus according to an embodiment of the present disclosure. FIG. 2B is a schematic perspective view of an electronic apparatus according to an embodiment of the present disclosure.

Referring to FIGS. 2A and 2B, an electronic apparatus 100 according to various embodiments may include a first surface (e.g., the front surface of the electronic apparatus 100) facing a first direction (+z direction), a second surface (e.g., the rear surface of the electronic apparatus 100) facing a direction opposite to the first direction (−z direction), and a third surface surrounding the space between the first surface and the second surface (e.g., a side surface of the electronic apparatus 100).

For example, the electronic apparatus 100 may include a frame 200 as a case that constitutes an appearance of the electronic apparatus 100.

For example, the electronic apparatus 100 may include a front case 202 constituting the first surface (e.g., the front surface), and a rear case 204 constituting a second surface (e.g., the rear surface) and/or the third surface (e.g., the side surface). For example, the electronic apparatus 100 may further include a rear cover (not shown) covering the second surface separately from the rear case 204, or the rear cover and the rear case 204 may be formed integrally with each other. For example, in order to make an image output from a display 151 viewed from the outside, the front case 202 may be formed of a window made of a substantially transparent material or may be in the form combined with the window.

According to various embodiments, the electronic apparatus 100 may include the display 151 and a user input part 123.

For example, the display 151 may be viewed from the outside through at least the first surface, and may output an image to the outside through the first surface. For example, the display 151 may have a substantially rectangular shape of which a width and length are different to correspond to the appearance of the electronic apparatus 100.

According to various embodiments, the user input part 123 may be provided as one or more user input parts and arranged to face the third surface (e.g., the side surface) of the electronic apparatus 100. For example, as shown in FIGS. 2A and 2B, the electronic apparatus 100 may include a first input part 123a and a second input part 123b on one side of the third surface, and a third input part 123c, 123c' on the other side of the third surface.

The arrangement and number of the user input part 123 disclosed in FIGS. 2A and 2B are merely exemplary to provide a better understanding of the present disclosure, and aspects of the present disclosure is not limited thereto. For example, according to another embodiment, the electronic apparatus 100 may include only at least one of the first input part 123a, the second input part 123b, and the third input part 123c, 123c'. Alternatively, unlike what is shown in the drawings, the first input part 123a, the second input part 123b, and the third input parts 123c, 123c' may be all arranged on the same plane (e.g., the left or right side surface of the electronic apparatus 100).

For example, the user input part 123 may acquire user information by sensing whether or not it is pressed by an external object (e.g., a user's finger). For example, the user input part 123 may include a pressure sensor (e.g., a strain gauge, a piezo sensor, etc.) capable of acquiring information on pressure position and/or pressure intensity in various ways. According to an embodiment, the electronic apparatus 100 (e.g., a controller 180 of the electronic apparatus 100) may determine whether a predetermined input signal is received as user information through the user input part 123. In response to reception of the input signal, the electronic apparatus 100 may output a tactile effect and/or a sound effect to notify the reception of the user input.

According to various embodiments of the present disclosure, the controller 180 of the electronic apparatus 100 may control the user input part 123 based on a change in posture of the electronic apparatus 100. For example, the electronic apparatus 100 may control at least a portion of the user input part 123 to change a position of a region for receiving a user input based on the posture of the electronic apparatus 100. A detailed description regarding this will be provided later with reference to FIGS. 3 and 4.

Figure 3:
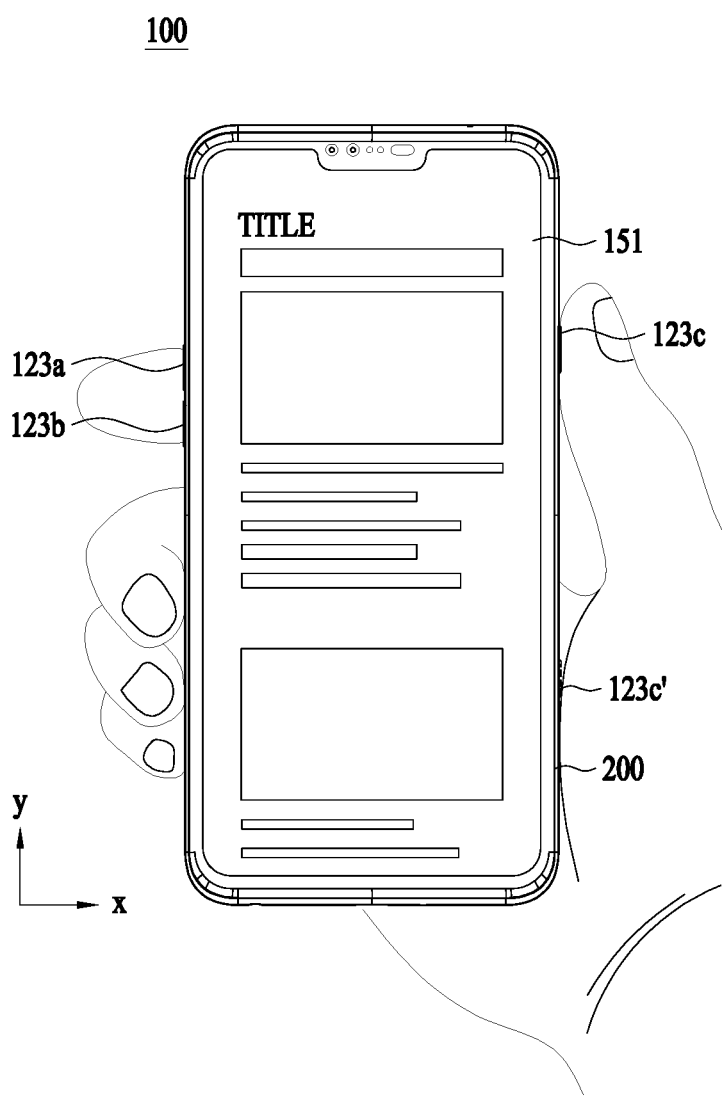
FIG. 3 is a view illustrating a state in which an electronic apparatus according to an embodiment of the present disclosure is gripped in a portrait mode.
Figure 4:
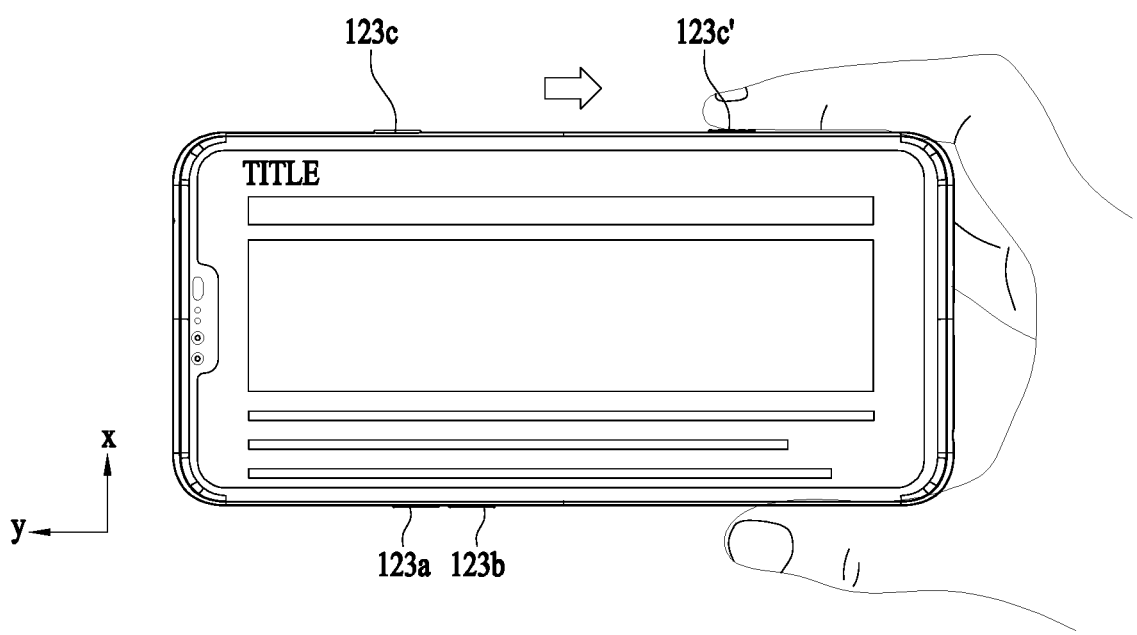
FIG. 4 is a view illustrating a state in which an electronic apparatus according to an embodiment of the present disclosure is gripped in a landscape mode.

FIG. 3 is a view illustrating a state in which the electronic apparatus 100 according to an embodiment of the present disclosure in is gripped in a portrait mode. FIG. 4 is a view illustrating a state in which the electronic apparatus 100 according to an embodiment of the present disclosure is gripped in a landscape mode.

Referring to FIGS. 3 and 4, the electronic apparatus 100 (e.g., the controller 180) may acquire information associated with a posture of the electronic apparatus 100 using the at least one sensor (e.g., the sensing part 140 of FIG. 1), and determine a mode of the electronic apparatus 100 in either a portrait mode (see FIG. 3) or a landscape mode (see FIG. 4).

As described above, the electronic apparatus 100 may have a substantially rectangular bar shape of which a width and a length are different.

For example, the electronic apparatus 100 may acquire information associated with the posture of the electronic apparatus 100 using at least one of a gyro sensor or a gravity sensor. For example, the information associated with the posture of the electronic apparatus 100 may include information associated with an angle that one side surface of the electronic apparatus 100 forms with the ground.

For example, as shown in FIG. 3, when a shorter side surface of the electronic apparatus 100 is directed toward a relatively upper or lower part with respect to the ground, the electronic apparatus 100 may operate in the portrait mode. For example, as shown in FIG. 4, when a longer side surface of the electronic apparatus 100 is directed toward a relatively upper or lower part with respect to the ground, the electronic apparatus 100 may operate in the landscape mode.

The electronic apparatus 100 may determine whether to rotate an orientation of an image output to the display 151 based on the posture of the electronic apparatus 100. For example, when the electronic apparatus 100 switches from the portrait mode to the landscape mode or from the landscape mode to the portrait mode as the posture of the electronic apparatus 100 changes, the electronic apparatus 100 may rotate an orientation of an image output to the display 151 so that an upper part of the image is output in an upper part of the electronic apparatus 100 with reference to the ground.

Meanwhile, such changing the image output orientation of the display 151 based on the posture of the electronic apparatus 100 may or may not be carried out according to a user's selection.

According to various embodiments, the electronic apparatus 100 may include at least one user input part 123.

For example, the electronic apparatus 100 according to an embodiment may include the third input part 123c, 123c' that is arranged on the right side surface relative to the first surface (e.g., the front surface) of the electronic apparatus 100 in a state in which the electronic apparatus 100 is in the portrait mode, as shown in FIG. 3.

The third input part 123c, 123c' may include a first region 123c and a second region 123c'. The first region 123c and the second region 123c' are regions for receiving a user input and may be arranged with a predetermined space therebetween.

The electronic apparatus 100 (e.g., the controller 180) according to various embodiments of the present disclosure may determine, based on the posture of the electronic apparatus 100, one of the first region 123c and the second region 123c in the third input part 123c, 123c' as the activation region. The activation region may refer to a region in which receiving a sensing signal is activated so that a user input, that is, a pressing or touch by an external object can be recognized.

For example, when the first region 123c is determined as the activation region, the electronic apparatus 100 may identify whether a user input is received through the first region 123c. When a user input is received through the first region 123c, the electronic apparatus 100 may execute a designated function (e.g., switching between a sleep mode and a wake-up mode of the electronic apparatus 100, and the like). On the other hand, when the first region 123c is determined as the activation region, the second region 123c' may be deactivated and hence a user input may not be received through the second region 123c'.

For example, when the second region 123c' is determined as the activation region, the electronic apparatus 100 may activates the second region 123c' to receive a user input through the second region 123c'. For example, when a predetermined user input is received through the second region 123c', the electronic apparatus 100 may execute a designated function. The designated function may be the same as the function that is executed when a user input is received through the first region 123c determined as the activation region. For example, when the second region 123c' is determined as the activation region, the first region 123c may be deactivated and hence a user input received through the first region 123c may be ignored.

In other words, the first region 123c and the second region 123c' operate in such a way that when one region is deactivated, the other region is activated. Functions of the first region 123c and the second region 123c' may be replaced.

Referring back to FIG. 3, when the electronic apparatus 100 is determined to be in the portrait mode based on the posture of the electronic apparatus 100, the electronic apparatus 100 according to various embodiments of the present disclosure may determine the first region 123c as the activation region. For example, while gripping by one hand the electronic apparatus 100 operating in the portrait mode, a user may presses the first region 123c of the third input part to input a signal and thereby execute a designated function.

Referring to FIG. 4, when the electronic apparatus 100 switches from the portrait mode to the landscape mode due to a change in posture of the electronic apparatus 100, the electronic apparatus 100 may deactivate the first region 123c and designate the second region 123c' as an activation region. For example, in a state in which the electronic apparatus 100 is gripped in the landscape mode, it may not be easy to press the first region 123c with a gripping hand: however, the second region 123c' may be readily pressed to input a signal to the electronic apparatus 100.

Although not illustrated, when the electronic apparatus 100 switches to the landscape mode based on a posture thereof and operates in the landscape mode, the position of the user input part 123 may be changed so that a user input can be received at a position other than the positions of the first input part 123a and the second input part 123b.

Figure 5A:
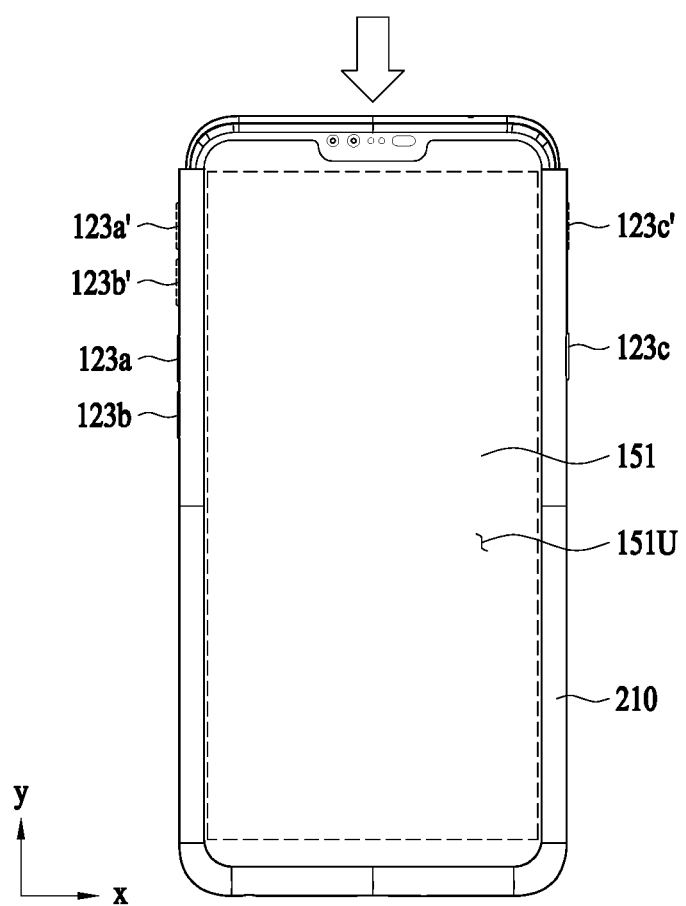
FIGS. 5A to 5C are front views of an electronic apparatus according to an embodiment of the present disclosure.
Figure 5B:
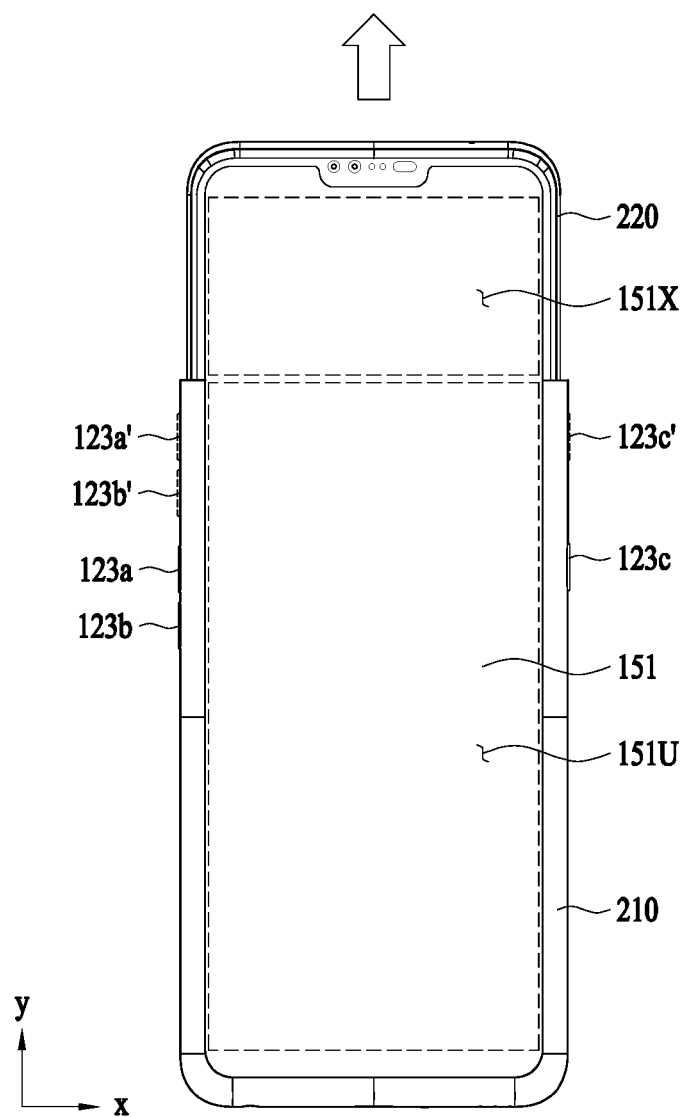
Figure 5C:
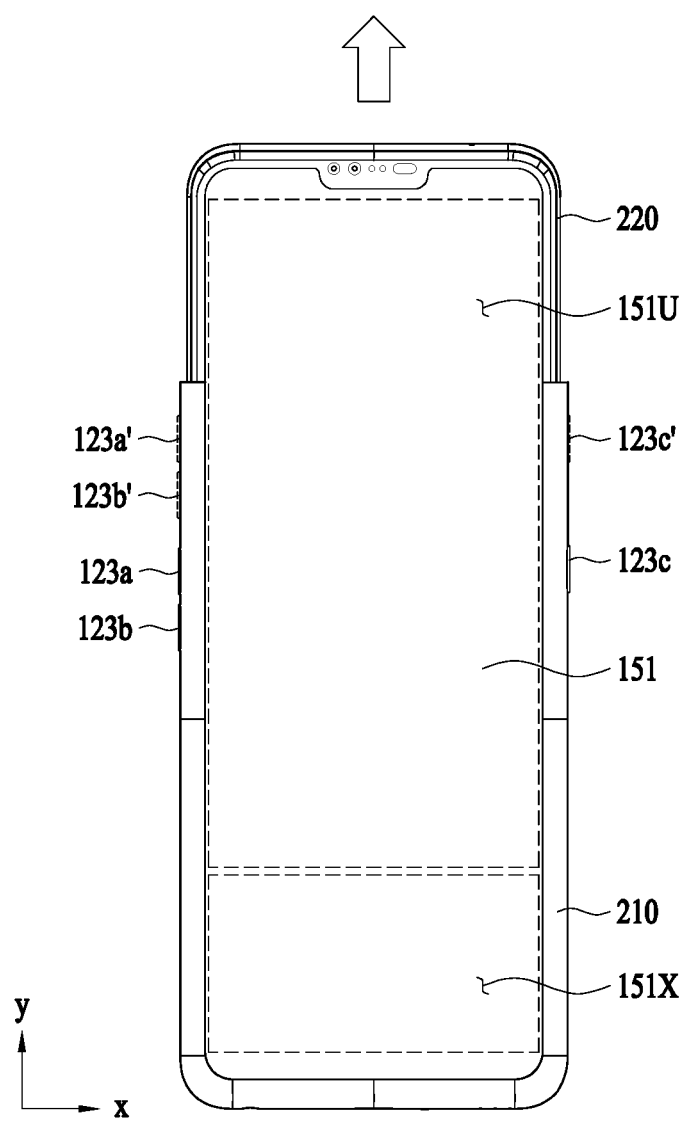

FIGS. 5A to 5C schematically illustrate front views of electronic apparatus according to various embodiments of the present disclosure. For example, FIG. 5A is a front view in which a first image output region of the electronic apparatus 100 according to an embodiment of the present disclosure is reduced in size, and FIGS. 5B and 5C are front views in which the first image output region of the electronic apparatus 100 of FIG. 5A is expanded in size.

The electronic apparatus 100 according to various embodiments of the present disclosure may include a flexible display 151 capable of expanding or reducing the size of the first image output region which is viewed through the first surface (e.g., the front surface) of the electronic apparatus 100, and which outputs an image through the first surface.

For example, the display 151 (a flexible display) is rolled, folded, or bent in a specific region (e.g., the upper or lower part of the electronic apparatus 100). As the position of the display region to be rolled, folded, or bent moves, the first image output region of the display 151 facing the first surface of the electronic apparatus 100 may be expanded or reduced in size.

According to an embodiment, the electronic apparatus 100 may further include a display region (e.g., a second image output region) facing a second surface (e.g., a back surface) that opposes the first surface of the electronic apparatus 100. For example, the second image output region is a region for outputting an image through the second surface (e.g., the rear surface) of the electronic apparatus 100, and may include a display region that can be viewed through the second surface.

Referring to 5A to 5C, the first image output region may include a fixed region 151U and a variable region 151X. For example, the fixed region 151U may correspond to the display region that is viewed through the first surface of the electronic apparatus 100 even when the first image output region is reduced to a minimum. For example the variable region 151X may correspond to a display region that is additionally viewed through the first surface of the electronic apparatus 100 as the first image output region 151F is expanded. The region of the variable region 151X may change in size according to a degree to which the position of the rollable, bendable or foldable region in the display 151 moves. Meanwhile, the fixed region 151U may be at a constant position regardless of the change in position of the rollable, bendable or foldable region in the display 151.

The electronic apparatus 100 according to various embodiments of the present disclosure may include a frame, the frame which includes a first frame 210 and a second frame 220 capable of moving relative to the first frame 210. For example, the second frame 220 may linearly move in a sliding manner with respect to the first frame 210 to move away from or closer to the first frame 210.

The frame may serve to support the display 151 as a whole. For example, the first frame 210 and the second frame 220 may be positioned to substantially overlap each other in a state in which the display 151 is reduced. When the display 151 is expanded, the second frame 220 may move in a direction away from the first frame 210 so that the overlapping portion between the first frame 210 and the second frame 220 is reduced. In this case, one of the first frame 210 and the second frame 220 may additionally support an expanded region (e.g., the variable region 151X) of the display 151. Relative movement between the first frame 210 and the second frame 220 may be performed in response to expanding or reducing the display.

For example, the first image output region of the flexible display 151 facing one surface (e.g., the first surface) of the electronic apparatus 100 may be expanded or reduced in size according to an extent of relative movement between the first frame 210 and the second frame 220. For example, when the second frame 220 slides in a direction away from the first frame 210, a partial region (the second image output region) of the display 151 facing the second surface (e.g., the rear surface) of the electronic apparatus 100 may be drawn out, so that the partial region can be positioned to face the first surface as the first image output region. Accordingly, the first image output region may be expanded in size. For example, when the second frame 220 slides in a direction closer to the first frame 210, the electronic apparatus 100 may insert a partial region (e.g., the first image output region) of the display 151 facing the first surface of the electronic apparatus 100, so that the partial region can be positioned to face the second surface as the second image output region. Accordingly, the first image output region may be reduced in size.

For example, a rollable, bendable, or foldable region of the display 151 of the electronic apparatus 100 may be positioned in an upper part on the basis of the first surface of the electronic apparatus 100. In this case, as shown in FIG. 5B, when the second frame 220 moves in a direction away from the first frame 210, the variable region 151X may be gradually drawn out from the upper part of the electronic apparatus 100. Accordingly, the first image output region may be expanded.

In another example, a rollable, bendable, or foldable region of the display 151 of the electronic apparatus 100 may be positioned in a lower part on the basis of the first surface of the electronic apparatus 100. In this case, as shown in FIG. 5C, when the second frame 220 moves in the direction away from the first frame 210, the first image output region may be expanded in a manner in which the variable region 151X is gradually drawn out from the lower part of the electronic apparatus 100.

The electronic apparatus 100 according to various embodiments may include at least one user input part 123. According to an embodiment, the at least one user input part 123 may be disposed at a side surface part of the first frame 210.

According to an embodiment, at least a portion of the user input part 123 (e.g., a first input part 123a, 123a', a second input part 123b, 123b', and a third input part 123c, 123c') may include a first region and a second region for selectively receiving a user input according to a control of the controller 180. For example, the first input part 123a, 123a' may include a first region 123a and a second region 123a'. In each of the first region 123a and the second region 123a', the function of receiving a user's input may be activated or deactivated according to the control of the controller 180. For example, the first region and the second region may be disposed on the same side surface of the electronic apparatus 100.

Figure 6A:
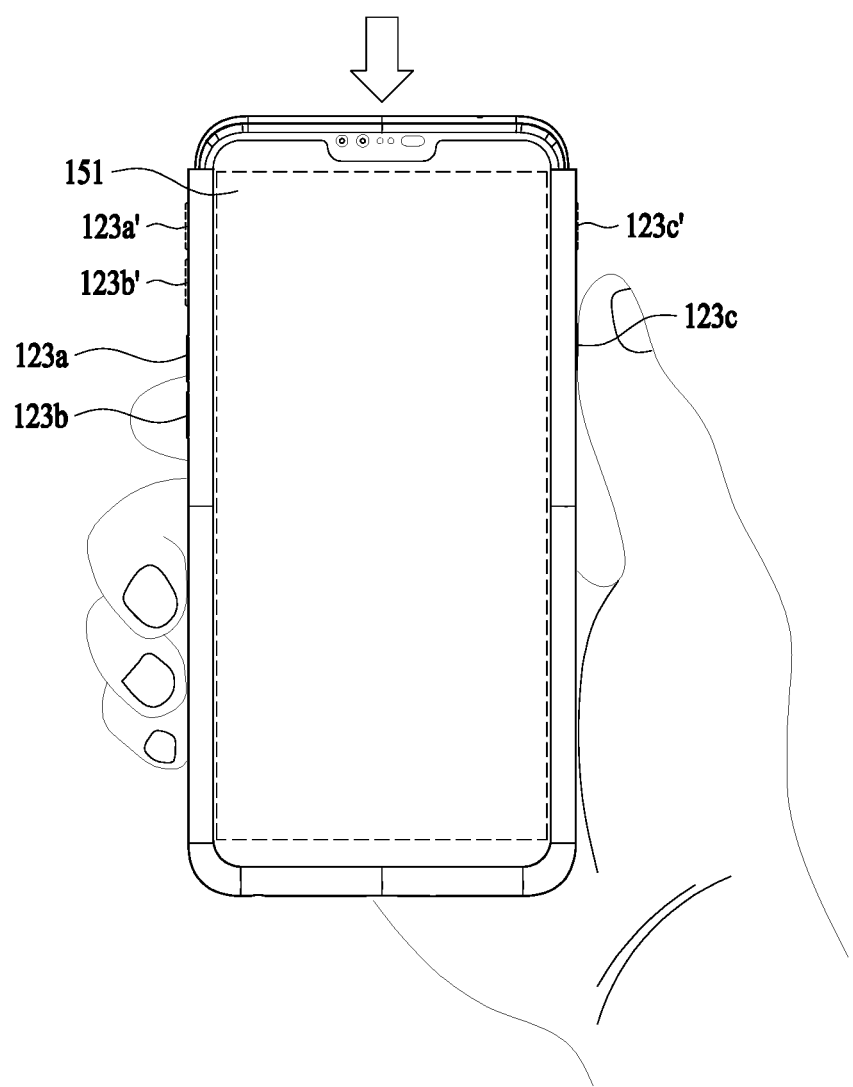
FIGS. 6A and 6B are views illustrating a state in which an electronic apparatus according to an embodiment of the present disclosure is gripped in a portrait mode.
Figure 6B:
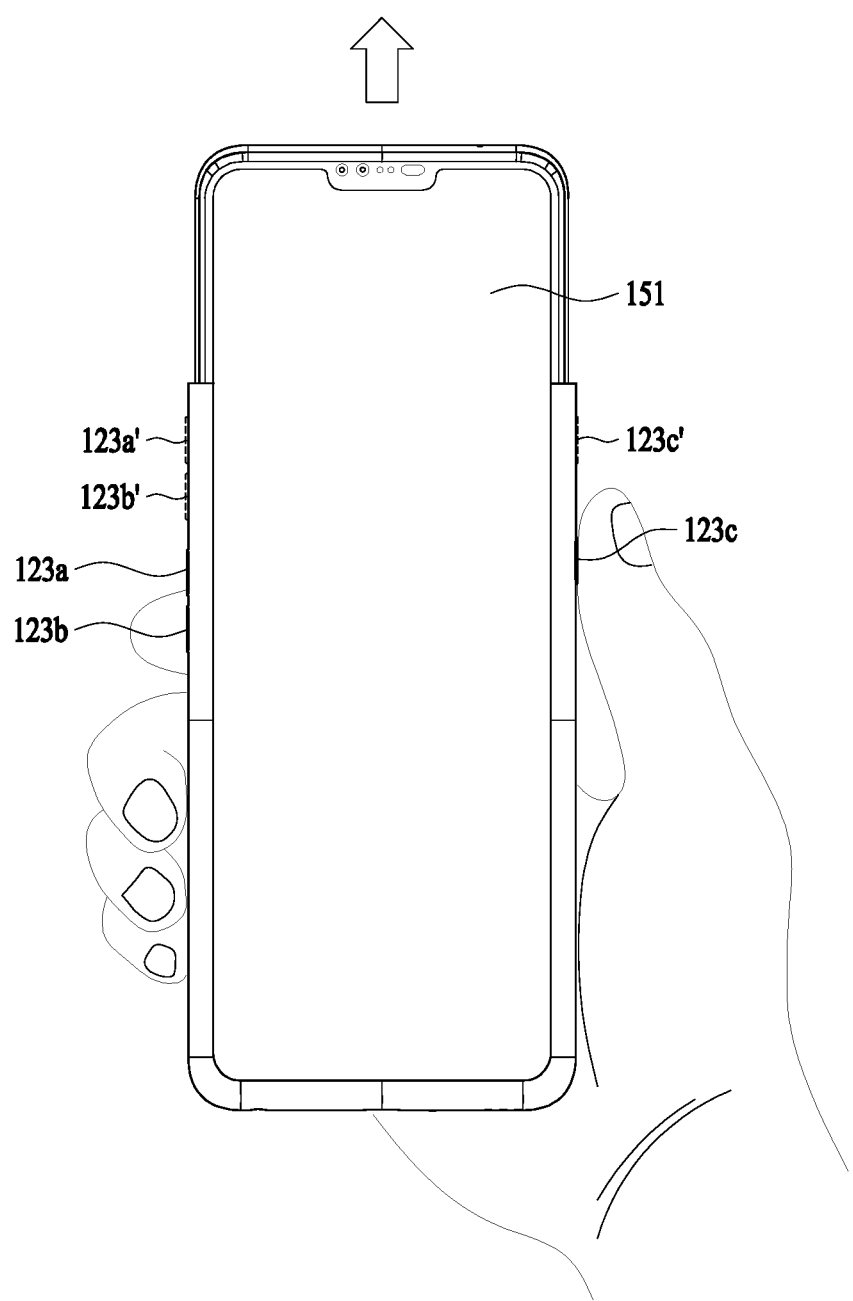

FIGS. 6A and 6B are views illustrating a state in which the electronic apparatus 100 according to an embodiment of the present disclosure is gripped in a portrait mode. FIG. 6A may correspond to a state in which the electronic apparatus 100 with a reduced first image output region of the display 151 is gripped, and FIG. 6B may correspond to a state in which the electronic apparatus 100 with an expanded first image output region of the display 151 is gripped.

According to various embodiments of the present disclosure, the electronic apparatus 100 may control the user input part 123 based on a posture of the electronic apparatus 100 and expansion of the display region (the first image output region) of the electronic apparatus 100.

For example, the electronic apparatus 100 may acquire information associated with a posture of the electronic apparatus 100 using at least one sensor (e.g., a gyro sensor, a gravity sensor, and the like), and may determine the electronic apparatus 100 in either a portrait mode or a landscape mode based on the acquired information. In addition, using at least one sensor (e.g., an optical sensor), the electronic apparatus 100 may acquire information associated with whether a region (the first image output region) of the display 151 for outputting an image toward the first surface (the front surface) of the electronic apparatus 100 is expanded in size. Then, the electronic apparatus 100 may determine whether the first image output region is expanded.

Referring to FIGS. 6A and 6B, according to various embodiments of the present disclosure, when the electronic apparatus 100 operates in the portrait mode based on a posture thereof, the electronic apparatus 100 may designate a first region 123a, 123b, 123c as an activation region from the user input part 123 including the first region 123a, 123b, 123c and a second region 123a', 123b', 123c', and may deactivate the second region 123a', 123b', 123c'.

According to various embodiments of the present disclosure, when the electronic apparatus 100 operates in the portrait mode, the electronic apparatus 100 may designate the first region as the activation region, regardless of whether or not the first image output region of the display 151 is expanded.

For example, as shown in FIGS. 6A and 6B, when the electronic apparatus 100 operates in the portrait mode, regardless of whether the first image output region is expanded, a user having gripped the electronic apparatus 100 with one hand is able to input a signal to the user input part 123 in the same region (the first region) using a finger of the corresponding hand.

Figure 7A:
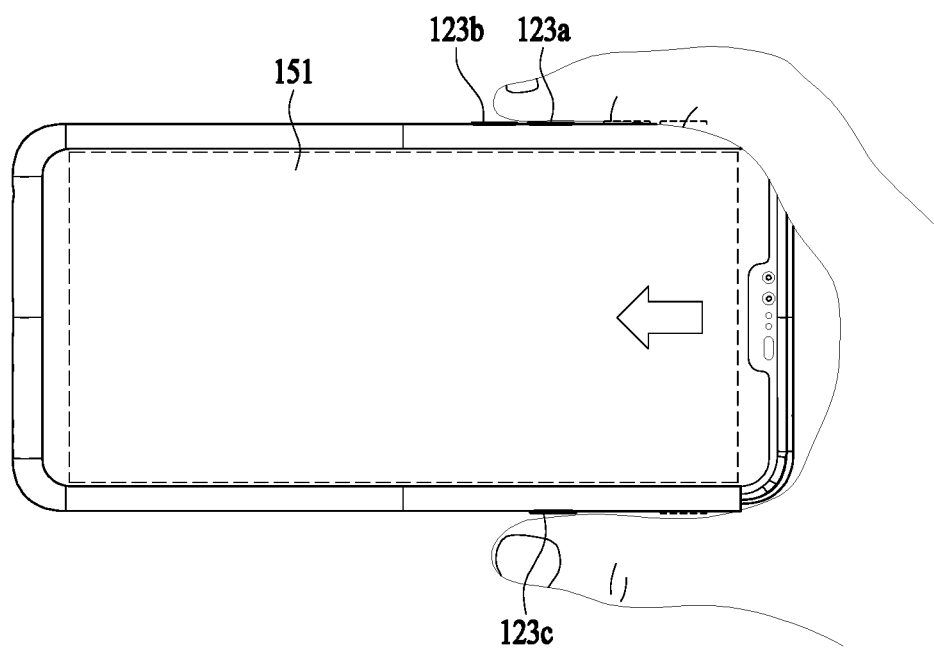
FIGS. 7A and 7B are views illustrating a state in which an electronic apparatus is gripped in a landscape mode according to an embodiment of the present disclosure.
Figure 7B:
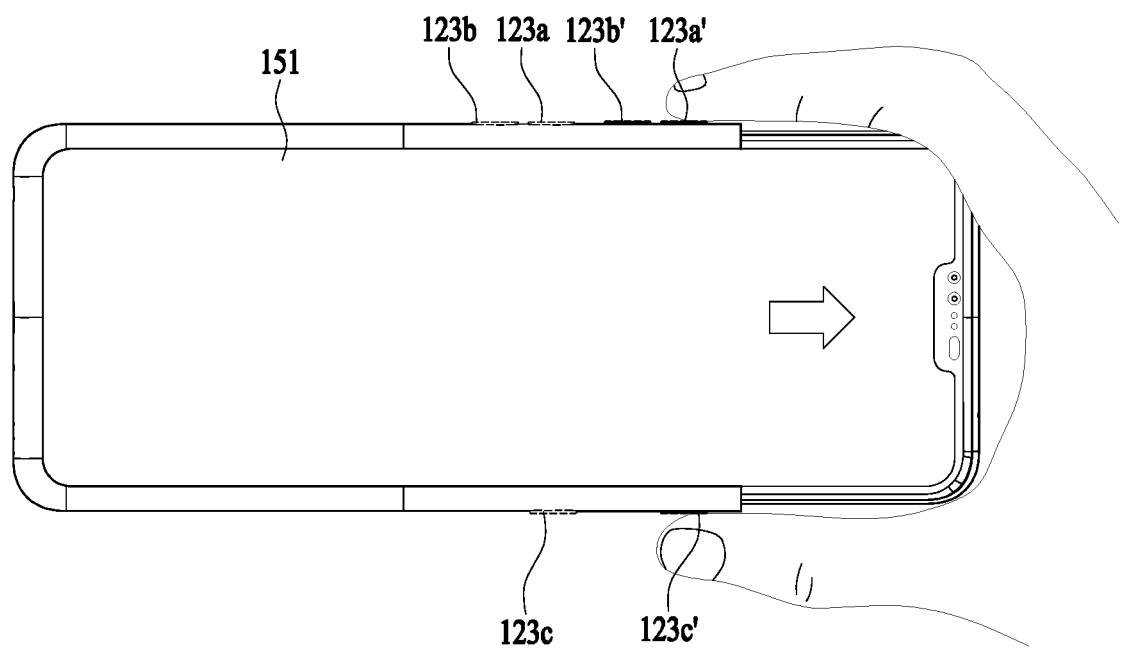

FIGS. 7A and 7B are diagrams illustrating a state in which the electronic apparatus 100 according to an embodiment of the present disclosure is gripped in the landscape mode. FIG. 7A may corresponds to a state in which the electronic apparatus 100 with a reduced first image output region of the display 151 is gripped, and FIG. 7B may correspond to a state in which the electronic apparatus 100 with an expanded first image output region of the display 151 is gripped.

Referring to 7A and 7B, the electronic apparatus 100 according to various embodiments of the present disclosure may control where to receive a user input in the user input part, based on a posture of the electronic apparatus 100 and expansion of the display region (the first image output region) of the electronic apparatus 100.

For example, when the electronic apparatus 100 operates in the landscape mode based on a posture of the electronic apparatus 100, the electronic apparatus 100 may determine a region (an activation region) for receiving a user input based on a size of the first image output region.

For example, as shown in FIG. 7A, when the electronic apparatus 100 operates in the landscape mode in a state in which the first image output region of the display 151 of the electronic apparatus 100 is reduced, the electronic apparatus 100 may designate the first region 123a, 123b, 123c as the activation region and may deactivate the second region 123a', 123b', 123c'. For example, the user may input a signal by pressing the activated first region 123a, 123b, 123c with a finger while gripping the electronic apparatus 100 with one hand, and the electronic apparatus 100 may execute a designated function based on the user input received through the first region 123a, 123b, 123c.

For example, as shown in FIG. 7B, when the electronic apparatus 100 operates in the landscape mode in a state in which the first image output region of the display 151 of the electronic apparatus 100 is expanded, the electronic apparatus 100 may designate the second region 123a', 123b', 123c' as the activation region and deactivate the first region 123a, 123b, 123c.

For example, in one embodiment, on a side surface of the first frame 210, the second region 123a', 123b', 123c' may be disposed adjacent to the second frame 220 than the first regions 123a, 123b, 123c. For example, while gripping the electronic apparatus 100 with one hand, the user may input a signal through the second region 123a', 123b', 123c' using a finger of the corresponding hand. The electronic apparatus 100 may execute a designated function based on the user input received through the second region 123a', 123b', 123c'.

For example, regardless of whether the electronic apparatus 100 operates in the portrait mode or the landscape mode, if the first image output region is reduced, a user input may be received through the first region 123a, 123b, 123c. If the first image output region of the electronic apparatus 100 operating in the landscape mode is expanded, a user input may be received through the second region 123a', 123b', 123c'.

The electronic apparatus 100 according to various embodiments may change the position of the user input part 123 based on a change in posture of the electronic apparatus 100 or a change in shape of the display 151, thereby providing improved usability so that a user input can be applied more easily.

According to an embodiment, when a user input is received through one region of the user input part 123 designated as the activation region, the electronic apparatus 100 may execute a preset function, regardless of where the activation region is positioned.

For example, the electronic apparatus 100 may execute the designated function in response to at least one of a force touch input, a double touch, or a gesture input to the activation region. For example, the electronic apparatus 100 may execute the designated function in response to simultaneous inputs to a plurality of regions (e.g., the regions 123a and 123c or the regions 123a' and 123c') in the activation region. According to an embodiment, the designated function may include at least one of: a command associated with expansion or reduction of the first image output region of the display 151, a command for adjusting the intensity of an acoustic signal, or a command for switching between a sleep mode and a wake-up mode of the electronic apparatus 100.

In addition, although not illustrated, the electronic apparatus 100 according to various embodiments may control an activation region of the user input part 123 based on a grip region for the user. For example, the electronic apparatus 100 may acquire information associated with the grip region using at least one sensor, and identify whether the electronic apparatus 100 is gripped with the left hand or the right hand based on the acquired information. For example, when the electronic apparatus 100 is gripped with the left hand, the electronic apparatus 100 may determine the first region of the user input part 123 as the activation region, and when the electronic apparatus 100 is gripped with the right hand, the electronic apparatus 100 may determine the second region of the user input part 123 as the activation region. For example, the electronic apparatus 100 may control the user input part based on at least one of: a posture of the electronic apparatus 100, a grip region of the electronic apparatus 100, or a change in shape of the display.

Figure 8A:
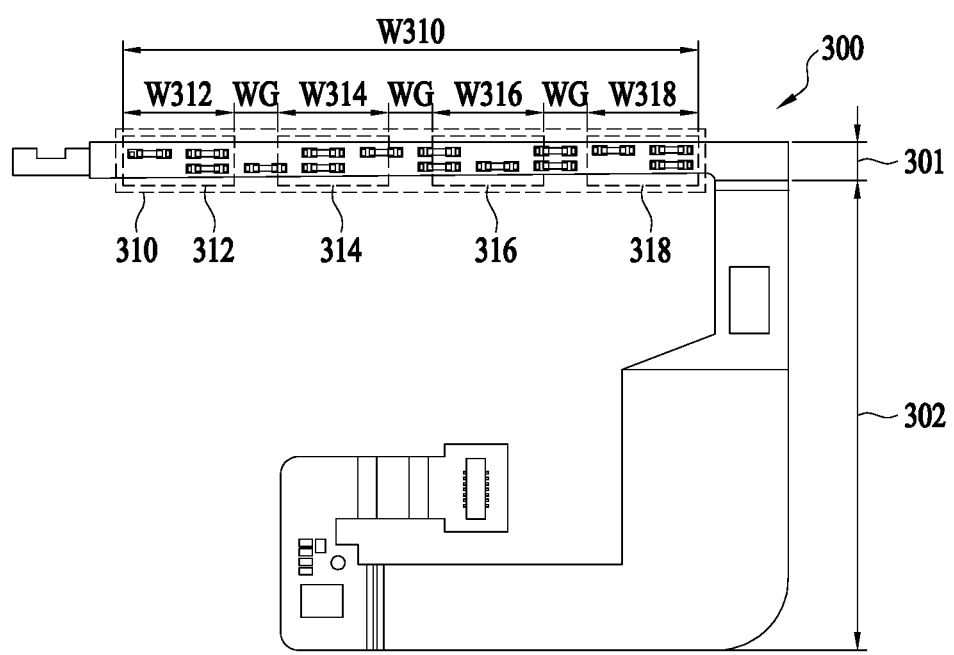
FIGS. 8A, 8B, and 8C are views schematically illustrating an input part according to an embodiment of the present disclosure.
Figure 8B:
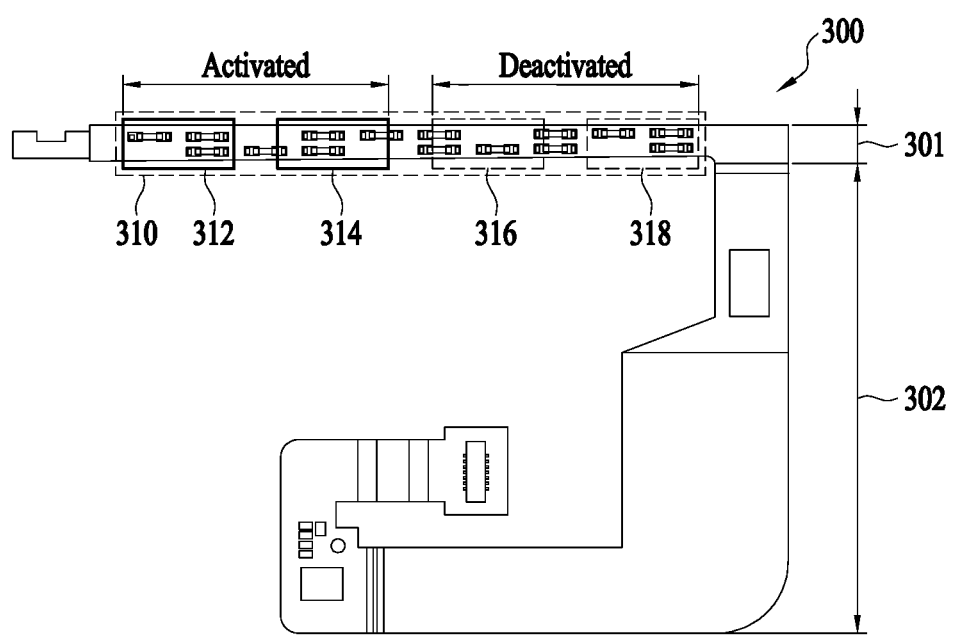
Figure 8C:
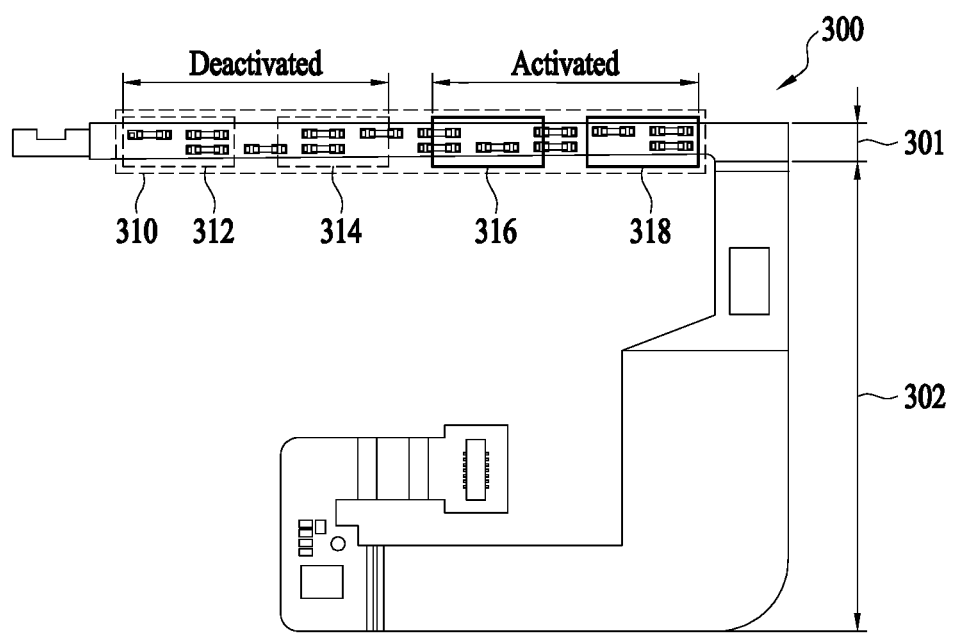

FIGS. 8A, 8B, and 8C are views schematically illustrating an input part of the electronic apparatus 100 according to an embodiment of the present disclosure.

Referring to FIGS. 8A, 8B, and 8C, the electronic apparatus 100 according to various embodiments of the present disclosure may include a strain gauge 300 as an input part.

For example, the strain gauge 300 may include a first part 301 arranged to face a side surface of the electronic apparatus 100, and a second part 302 disposed between the front and rear surfaces of the electronic apparatus 100. For example, the first part 301 may include a region 310 in which a user input can be received (hereinafter, referred to as a user input receiving region 310). For example, the second part 302 may be connected to a printed circuit board electrically connected to the controller 180 of the electronic apparatus 100 and may transmit an input signal received through the first part 301 to the controller 180.

For example, the strain gauge 300 may receive pressure information (e.g., the intensity of pressure of each region) regarding the user input receiving region 310, and determine whether a user input is received based on the received pressure information. For example, the strain gauge 300 may acquire the pressure information based on a change in length and a change in resistance caused when pressure is applied to one region. For example, the strain gauge 300 may acquire information associated with a location where the pressure is applied, and information associated with intensity of the pressure.

According to various embodiments of the present disclosure, the user input receiving region 310 of the strain gauge 300 may be divided into a plurality of regions spaced apart from one another. For example, the electronic apparatus 10 may ignore pressure information generated in a space (e.g., a deactivation region) spaced between the plurality of regions, to which region the user input is received among the spaced regions. Can be identified.

For example, according to one embodiment, the strain gauge 300, as shown in FIGS. 8A, 8B, and 8C, may include region A 312, region B 314, region C 316, and region D 318 spaced apart at predetermined intervals. For example, the region A 312, the region B 314, the region C 316, and the region D 318 may correspond to the reference numerals 123*b*, 123*a*, 123*b*′, and 123*a*′ shown in FIG. 5A, respectively.

In FIG. 8A, there is illustrated a structure in which the region A 312 to the region D 318 are spaced apart at the same spacing WG. However, the spacing and arrangement may be variously changed in design. For example, the spacing between the region B 314 and the region C 316 may have a larger spacing than the spacing between other regions.

According to various embodiments, the electronic apparatus 100 (e.g., the controller 180) may control the operation of the strain gauge 300. For example, the electronic apparatus 100 may activate at least one of the divided regions of the strain gauge and deactivate the rest of the regions based on a posture of the electronic apparatus 100 or expansion of the first image output region of the display 151.

For example, as illustrated in FIG. 8B, the electronic apparatus 100 may control the strain gauge 300 to activate the region A 312 and the region B 314 and deactivate the region C 316 and the region D 318. Conversely, as shown in FIG. 8C, the electronic apparatus 100 may control the strain gauge 300 to deactivate the region A 312 and the region B 314 and to activate the region C 316 and the region D 318.

For example, if the region A 312 and the region B 314 are activated and the region C 316 and the region D 318 are deactivated, a first function corresponding to a user input received through the region A 312 may be different from a second function corresponding to a user input received through the region B 314. Meanwhile, when the region A 312 and the region B 314 are deactivated and the region C 316 and the region D 318 are activated based on at least one of a posture of the electronic apparatus 100 or expansion of the display region, a function corresponding to a user input received through the region C 316 may be the same as the first function corresponding to the user input received through the region A 312, and a function corresponding to a user input received through the region D 318 may be the same as the second function corresponding to the user input received through the region B 314.

According to another embodiment, based on a posture of the electronic apparatus 100 or expansion of the first image output region of the display 151, the electronic apparatus 100 may determine only one region from among the region A 312 to the region D 318 as the activation region and may receive a user input through the activation region. For example, when the electronic apparatus 100 operates in the landscape mode and the first image output region is reduced to a minimum size, the electronic apparatus 100 may determine the region A 312 as the activation region. In addition, when the electronic apparatus 100 operates in a landscape mode and the first image output region is expanded to a maximum size, the region D 318 may be determined as the activation region, and when the first image output region is expanded to a specific size, either the region B 314 or the region C 316 may be determined as the activation region.

According to an embodiment of the present disclosure, the electronic apparatus 100 may include a switching module for distinguishing and controlling the activation region and other regions among a plurality of regions of the strain gauge 300. The switching module may include single pole double thorow (SPDT) switches. For example, when changing from the state shown in FIG. 8B to the state shown in FIG. 8C, the electronic apparatus 100 may control the switching module so that a switch connected to the region A 312 is connected to the region C 316 and a switch connected to the region B 314 is connected to the region D 318. Conversely, when changing from the state shown in FIG. 8C to the state shown in FIG. 8B, the electronic apparatus 100 may control the switching module so that a switch connected to the region C 316 is connected to the region A 312 and a switch connected to the region D 318 is connected to the region B 314.

Figure 9A:
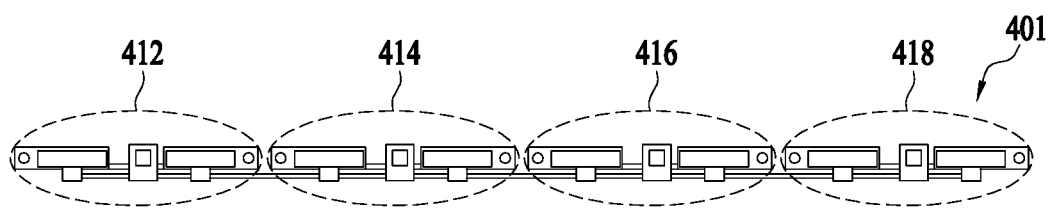
FIGS. 9A and 9B are views schematically illustrating an input part according to an embodiment of the present disclosure.
Figure 9B:
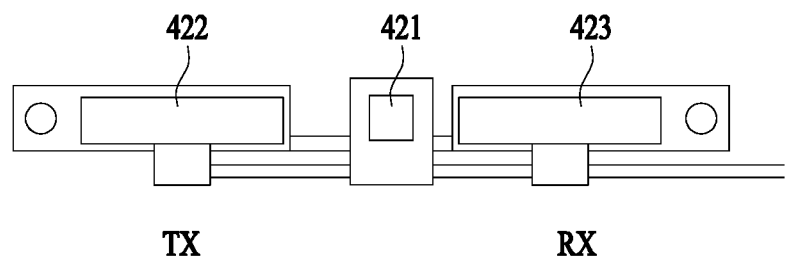

FIGS. 9A and 9B are diagrams for explaining an input part of the electronic apparatus 100 according to an embodiment of the present disclosure.

According to various embodiments, the electronic apparatus 100 may include a hybrid ultrasonic sensor as an input part.

The hybrid ultrasonic sensor is an element in substitute for the function of the strain gauge 300 described with reference to FIGS. 8A, 8B, and 8C, and the hybrid ultrasonic sensor may acquire user input information. FIG. 9A is a diagram schematically illustrating a part 401 of a hybrid ultrasonic sensor arranged to face a side surface of the electronic apparatus 100.

As shown in FIG. 9A, the hybrid ultrasonic sensor may include a plurality of sensor sets disposed corresponding to the plurality of regions 412, 414, 416, and 418. FIG. 9B is a diagram showing a specific sensor set of the hybrid ultrasonic sensor in more detail.

Referring to FIGS. 9A and 9B, according to an exemplary embodiment, each of the respective sensor sets included in the hybrid ultrasonic sensor and disposed in the plurality of regions may include a strain gauge sensor 421, a first piezo sensor 422, and a second piezo sensor 423.

For example, when pressure is applied to an external object (e.g., a finger) in a region where any of the sensor sets is positioned, the strain gauge sensor 421 may acquire information associated with a degree of the pressure (intensity of the pressure).

For example, the first piezo sensor 422 and the second piezo sensor 423 may acquire information associated with a surface acoustic wave (SAW) in a space between the first piezo sensor 422 and the second piezo sensor 423, and accordingly, when pressure is applied to an external object in a region where any of the sensor sets is positioned, the first piezo sensor 422 and the second piezo sensor 423 may acquire information associated with a position where the pressure is applied.

The electronic apparatus 100 according to an embodiment may acquire information associated with a position of a user input using the first piezo sensor 422 and the second piezo sensor 423 and may acquire information associated with a position of a user input using the strain gauge sensor 421 between the first piezo sensor 422 and the second piezo sensor 423. By combining the acquired information described above, the electronic apparatus 100 may determine whether a user input is received in one of the plurality of regions 412, 414, 416, and 418 included in the hybrid ultrasonic sensor.

Meanwhile, as described above, the plurality of regions included in the hybrid ultrasonic sensor may be selectively activated or deactivated based on a posture of the electronic apparatus 100 or expansion (or a degree of expansion) of the first image output region of the display 151.

Figure 10A:
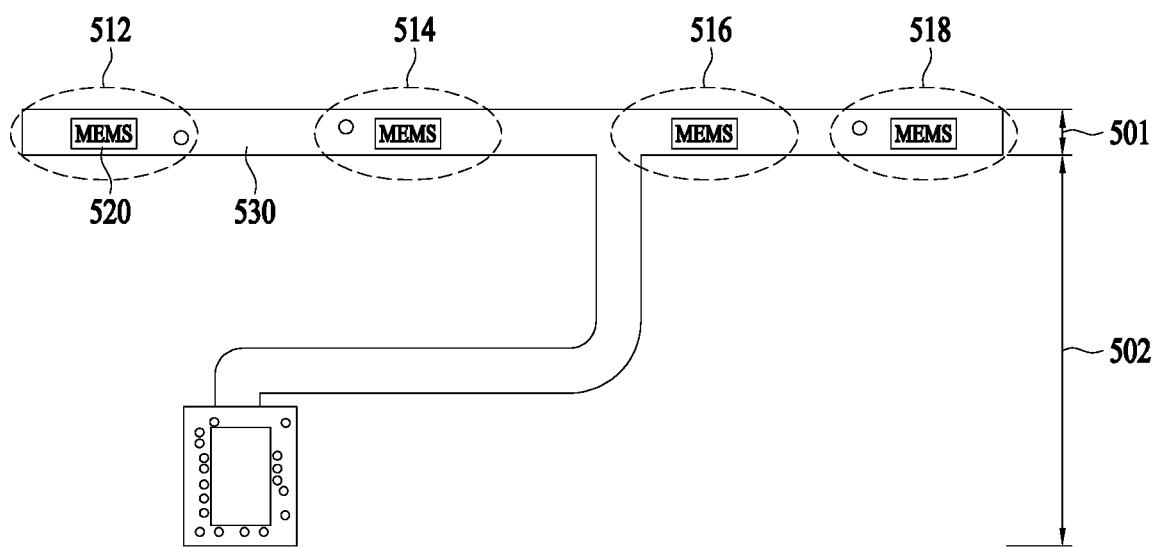
FIGS. 10A and 10B are views schematically illustrating an input part according to an embodiment of the present disclosure.
Figure 10B:
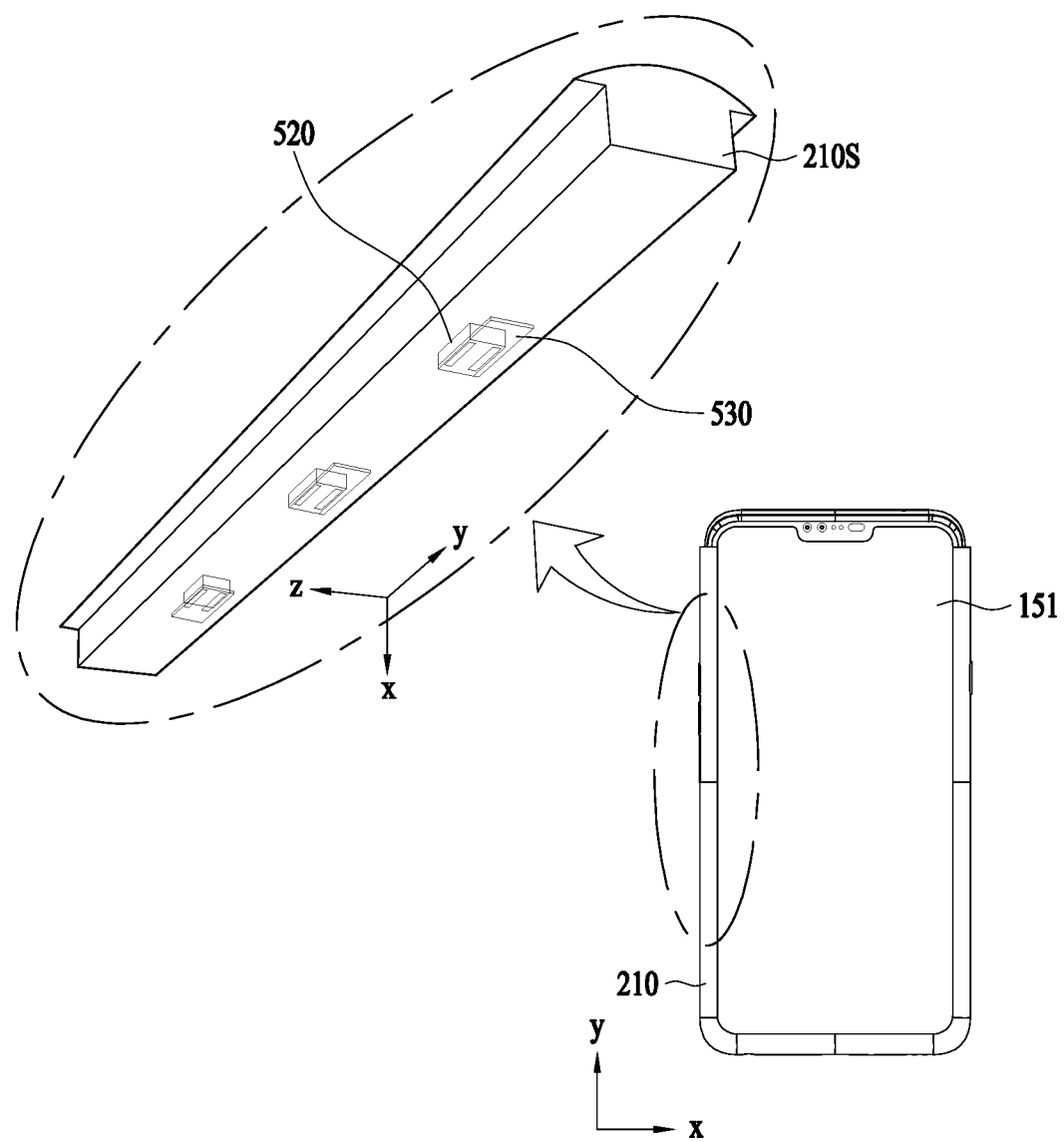

FIGS. 10A and 10B are diagrams for explaining an input part of the electronic apparatus 100 according to another embodiment of the present disclosure.

Referring to FIGS. 10A and 10B, the electronic apparatus 100 according to an embodiment may include a microelectromechanical systems (MEMS) hybrid force sensor as an input part.

For example, the MEMS hybrid force sensor may include a plurality of regions 512, 514, 516, and 518 spaced apart from one another on one part 501 of a printed circuit board 530 connected to the controller 180, the one part 501 which is arranged to face the side surface of the electronic apparatus 100. For example, the other part 502 of the printed circuit board 530 may be interposed between the front and rear surfaces of the electronic apparatus 100.

Each of the plurality of regions 512, 514, 516, and 518 included in the MEMS hybrid force sensor may include the MEMS sensor 520. For example, the MEMS sensor 520 may be integrally mounted to the printed circuit board.

For example, the MEMS sensor 520 may generate ultrasonic waves to the outside through the side surface of the electronic apparatus 100, and receive a user input by acquiring information on the ultrasonic waves reflected by an external object. For example, the MEMS sensor 520 may be attached or mounted to a bezel (or bumper) 210S of a frame (e.g., the first frame 210) that constitutes the side surface of the electronic apparatus 100.

According to an embodiment, the electronic apparatus 100 may determine at least one of the plurality of regions 512, 514, 516, or 518 of the MEMS hybrid force sensor as the activation region, and receive a user input through the activation region.

Figure 11A:
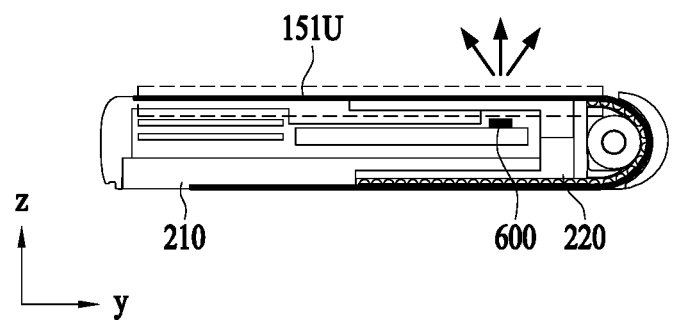
FIGS. 11A and 11B are schematic side cross-sectional views of an electronic apparatus according to an embodiment of the present disclosure.
Figure 11B:
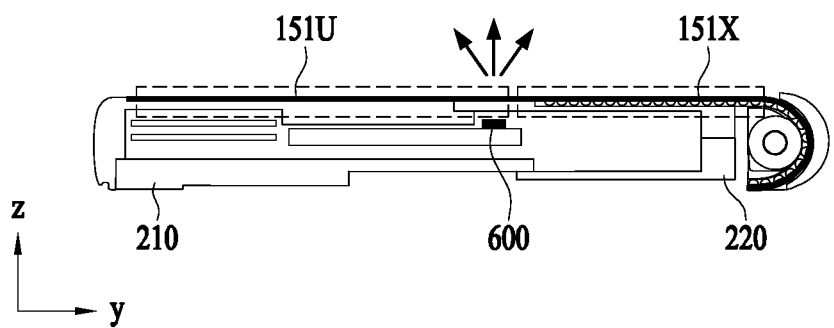

FIGS. 11A and 11B are side cross-sectional views of an electronic apparatus according to an embodiment of the present disclosure.

Referring to FIGS. 11A and 11B, the electronic apparatus 100 according to various embodiments of the present disclosure may include at least one sensor (e.g., an optical sensor) 600 arranged to face the first surface at a point between the first surface (e.g., the front surface) facing a first direction and the second surface (e.g., the rear surface) facing a direction opposite to the first direction.

As described with reference to FIGS. 5A to 5C, the electronic apparatus 100 according to various embodiments may include a display 151 that is rollable, foldable, or bendable at one region. As the rollable, foldable, or bendable region moves, a display region (the first image output region) of the display 151 facing the first surface may change in size.

According to an embodiment, the at least one sensor 600 may irradiate light to the outside through the first surface, and identify expansion (or a degree of expansion) of the first image output region by receiving information regarding the light reflected from the outside.

For example, the electronic apparatus 100 may include a second frame 220 that slides with respect to the first frame 210 to correspond to a change in size of the first image output region of the display 151. In addition, according to movement of the second frame 220 and a change in shape of the display 151, different information may be acquired from each of the at least one sensor 600.

The electronic apparatus 100 may use the at least one sensor 600 to acquire information associated with relative movement between the first frame 210 and the second frame 220 (e.g., a moving direction and a moving speed) and/or information associated with a change in size of the first image output region. The electronic apparatus 100 may control the user input part based on the acquired information.

The electronic apparatus according to various embodiments of the present disclosure may selectively expand or reduce an image output region a front or rear surface using a flexible display. Accordingly, it is possible to provide an electronic apparatus that is highly portable and selectively utilizes a large-area display.

The electronic apparatus according to various embodiments of the present disclosure may provide an input part through which a user input can be input easily even when there is a change in shape or posture of the electronic apparatus, thereby improving user convenience.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, those skilled in the art will understand the scope of the disclosure is not limited by the explicitly described above embodiments but by the claims and equivalents thereof.

What is claimed is:

1. An electronic apparatus comprising:
 a display comprising a first image output region configured to output an image through a front surface of the electronic apparatus;
 an input portion arranged to face a side surface of the electronic apparatus and comprising a first region and a second region; and
 a controller,
 wherein the controller is configured to:
 determine either the first region or the second region as being an activation region of the input portion based on a posture of the electronic apparatus and a size of the first image output region; and receive a user input through the activation region.

2. The electronic apparatus of claim 1, further comprising at least one sensor,
wherein the controller is further configured to:
acquire information associated with at least one of the posture of the electronic apparatus or the size of the first image output region using the at least one sensor.

3. The electronic apparatus of claim 2, wherein the controller is further configured to determine an image output orientation of the display and the activation region in response to determining a mode of the electronic apparatus as being either a landscape mode or a portrait mode based on the posture of the electronic apparatus.

4. The electronic apparatus of claim 3, wherein the controller is further configured to:
based on the determined mode of the electronic apparatus being the landscape mode, determine the first region as being the activation region; and
based on the determined mode of the electronic apparatus being the portrait mode, determine the second region as being the activation region.

5. The electronic apparatus of claim 1, wherein the controller is further configured to:
based on determining the first region as being the activation region, deactivate the second region; and
based on determining the second region as being the activation region, deactivate the first region.

6. The electronic apparatus of claim 1, wherein the controller is further configured to execute a designated function based on the user input being received through the activation region.

7. The electronic apparatus of claim 1, wherein:
the input portion comprises a strain gauge; and
the strain gauge comprises the first region, the second region, and a deactivation region interposed between the first region and the second region.

8. An electronic apparatus comprising:
a first frame;
a second frame disposed to be slidable with respect to the first frame;
a flexible display supported by the first frame and the second frame, and having a first image output region for outputting an image through a front surface of the electronic apparatus,
wherein a size of the first image output region changes in correspondence with relative movement between the first frame and the second frame;
an input portion comprising a first region and a second region;
at least one sensor; and
a controller,
wherein the controller is configured to:
acquire information associated with a posture of the electronic apparatus and the size of the first image output region using the at least one sensor; and
determine either the first region or the second region as being an activation region of the input portion based on the acquired information; and
receive a user input through the activation region.

9. The electronic apparatus of claim 8, wherein the controller is further configured to:
determine a mode of the electronic apparatus as being either a landscape mode or a portrait mode based on information associated with the posture of the electronic apparatus; and determine an image output orientation of the first image output region and the activation region based on the determined mode.

10. The electronic apparatus of claim 9, wherein the controller is further configured to:
based on the determined mode of the electronic apparatus being the portrait mode, determine the first region as being the activation region; and
based on the determined mode of the electronic apparatus being the landscape mode and the size of the first image output region being equal to or larger than a predetermined size, determine the second region as being the activation region.

11. The electronic apparatus of claim 10, wherein the controller is further configured to, based on the determined mode of the electronic apparatus being the landscape mode and the size of the first image output region being smaller than the predetermined size, determine the first region as being the activation region.

12. The electronic apparatus of claim 10, wherein:
the first region and the second region are arranged to face a first side surface of the first frame; and
the second region is positioned closer than the first region to a second side surface of the second frame that is perpendicular to the first side surface of the first frame.

13. The electronic apparatus of claim 12, wherein the controller is further configured to:
in response to determining, based on the posture of the electronic apparatus, that the first side surface of the first frame is positioned at an upper portion of the electronic apparatus, determine the mode of the electronic apparatus as being the landscape mode; and
in response to determining, based on the posture of the electronic apparatus, that the first side surface of the first frame is positioned at a lower portion of the electronic apparatus, determine the mode of the electronic apparatus as being the portrait mode.

14. The electronic apparatus of claim 8, wherein the controller is further configured to:
based on determining the first region as being the activation region, deactivate the second region; and
based on determining the second region as being the activation region, deactivate the first region.

15. The electronic apparatus of claim 8, wherein the input portion comprises at least one of a pressure sensor or an ultrasonic sensor.

16. The electronic apparatus of claim 8, wherein:
the input portion comprises a strain gauge; and
the strain gauge comprises the first region, the second region, and a deactivation region interposed between the first region and the second region.

17. The electronic apparatus of claim 8, wherein:
the input portion comprises a plurality of sensor sets arranged to correspond to the first region and the second region; and
the plurality of sensor sets comprises a strain gauge and a plurality of piezo sensors arranged with the strain gauge interposed therebetween.

18. The electronic apparatus of claim 8, wherein:
the input portion further comprises a third region and a fourth region, wherein the first region, the second region, the third region and the fourth region are sequentially arranged on a same plane and spaced apart from each other at predetermined intervals; and the controller is further configured to, based on the acquired information, determine either the first and third regions or the second and fourth regions as being activation regions.

19. The electronic apparatus of claim 8, wherein:
the input portion further comprises at least one of a pressure sensor or an ultrasonic sensor; and
the at least one of the pressure sensor or the ultrasonic sensor is mounted to a printed circuit board electrically connected to the controller.

20. The electronic apparatus of claim 8, wherein the at least one sensor comprises at least one of a gyro sensor or an optical sensor.

\* \* \* \* \*